Oct. 8, 1940.   G. F. LE BUS   2,216,819
REMOVABLE END FILLER FOR CABLE WINDING DEVICES
Filed Oct. 14, 1938
FIG. 1.
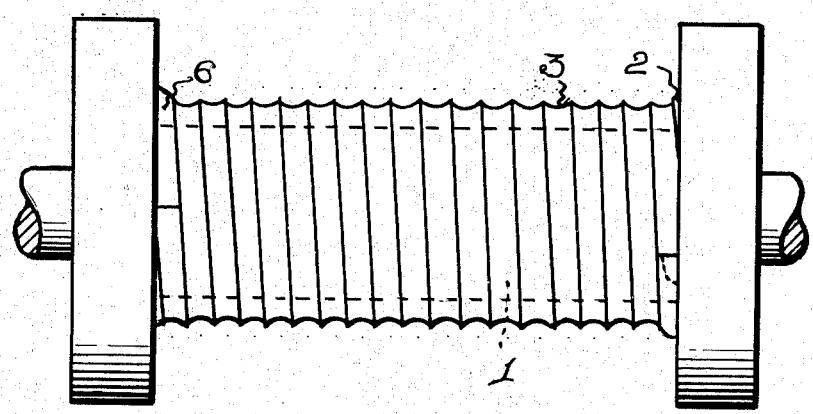
FIG. 2.   FIG. 3.
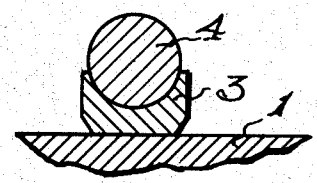 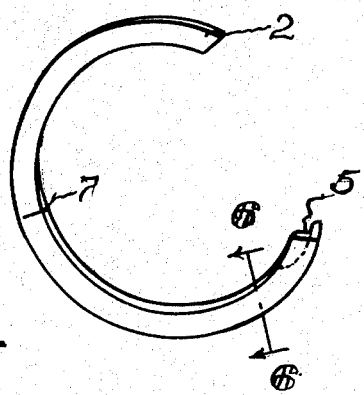
FIG. 4.

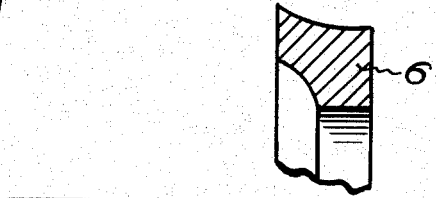
FIG. 6.
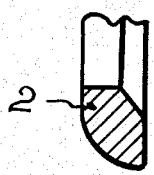
George F. LeBus
INVENTOR.
BY *[signature]*
ATTORNEY.

Patented Oct. 8, 1940

2,216,819

UNITED STATES PATENT OFFICE 2,216,819

REMOVABLE END FILLER FOR CABLE WINDING DEVICES

George Franklin Le Bus, Longview, Tex.

Application October 14, 1938, Serial No. 234,909

1 Claim. (Cl. 242—117)

This invention relates to cable and rope winding devices and it has particular reference to an apparatus for "spooling" or level winding of cable.

The principal object of the invention is to provide a structure positioned at either end of the spool and so arranged that a cable will be constrained to be wound in a predetermined and uniform position as rotation of the spool is effected by a source of power.

Another object of the invention is to provide a structure capable of being readily welded or otherwise suitably secured to the ends of the spool or drum and so arranged that the cable is guided into a predetermined path as the drum is rotated.

Still another object of the invention is to provide removable end fillers for reels which are adaptable for use on reels, either of the conventional type grooved drums or drum cores on which a grooved bar has been installed.

Yet another object of the invention is to provide an end guide for a cable so arranged that it may be readily attached to the reel and which will serve to guide the cable in its alternate motion during the revolution of the reel.

Still another object of the invention is to provide an end reel guide so arranged and chamfered that it may be readily welded to the reel.

A still further object of the invention is to provide end guides capable of adaptation to any form of reel using any type of grooved surface.

Yet another object of the invention is to provide end fillers for reels which are pre-fabricated in such a manner that they may be readily expanded, installed, and subsequently secured in the desired position.

Yet another object of the invention is to provide an apparatus which may be readily installed or replaced with a minimum of cost upon a reel and which apparatus is simple in construction and highly efficient in use.

With the foregoing objects as paramount, the invention has particular reference to its salient features of construction and arrangement of parts which will become manifest as the description proceeds taken in connection with the accompanying drawing, wherein:

Figure 1 is an elevational view of the end fillers shown in operative position.

Figure 2 is a fragmentary view in cross section and showing the relationship of a cable or rope in place upon a grooved bar positioned upon a reel.

Figure 3 is a perspective view of one of the end fillers.

Figure 4 is a perspective view of the companion filler positioned at the opposite end of the reel.

Figure 6 is a fragmentary view taken on the line 6—6 on Figure 3.

Figure 5:
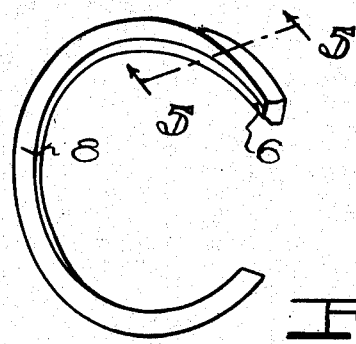
Figure 5 is a fragmentary view taken on the line 5—5 on Figure 4.

Referring primarily to Figure 1, the reference numeral 1 denotes a reel, spool or drum, such as is used in connection with elevators, hoisting machinery and the like.

An end filler 2 shown in perspective in Figure 3 is welded or otherwise suitably secured to the drum core.

A grooved bar 3 is tack-welded or otherwise suitably affixed in adjacent relationship to the end filler 2 and is wound around the drum core in the manner described in applicant's co-pending application, Serial Number 206,009. The grooved bar 3 serves as a support and guide for a cable or rope 4 shown only in Figure 2.

The rope or cable 4 is secured to the drum in any conventional manner such as by means of a clamp, a mule-tail or other means of securement. Referring to Figure 3 it will be observed that a recess 5 is provided in the end filler 2 through which the rope or cable 4 is placed prior to the winding upon the grooved drum.

After the grooved guide 3 has been wound upon the spool 1 to a position adjacent the end of the spool, the end filler 6 is welded around its periphery or otherwise suitably secured to the drum or spool. The guide 3 is then welded to the end filler 6, thereby effecting a unitary structure from one end of the drum to the other.

Heretofore, hoisting equipment has been raised and lowered by means of a rope or cable wound upon a smooth or grooved drum. The disadvantage of a smooth drum is that a flattening of the cable results and grooved drums heretofore employed have not been provided with removable end fillers to guide the rope or cable into the second layer or wrap. It is highly important that the second layer be positioned and guided into a predetermined position relative to the primary wrap upon the drum.

Referring to Figures 3 and 4 it will be observed that the end fillers 2 and 6 are pre-fabricated and provided with slots 7 and 8 respectively. These slots provide means by which the end fillers 2 and 6 may be opened or expanded after subjecting the same to heat and thence secured to the drum core as shown in Figure 1.

It will be understood that the primary purpose of the end fillers 2 and 6 is to provide a means of taking care of the space which is left as a result of the winding of a cable or line guide strip upon the drum, the end fillers being so constructed that the cable is constrained to move in the opposite direction after reaching the end of the spool or drum. These end fillers are equally applicable to any type of grooved drums which are so constructed that the grooved support and guide means may be removed and replaced. Heretofore chafing and severe wear has occurred upon cables subjected to heavy duty when the cables have been constrained to move into a semi-peripheral opening at the ends of the drum. The present invention provides a means which will preclude this effect on the cable.

Manifestly, the construction illustrated and herein described is capable of considerable modification, and such modification as is considered within the scope of the appended claim is likewise considered within the spirit and intent of the invention.

What is claimed is:

An article of manufacture, comprising a hoisting drum having a head member at each end, a spirally wound rope guide strip secured to the drum, the guide strip being of such a width that a space remains between the ends of the guide strip and the heads of the drum, a removable end filler substantially C-shaped in side elevation secured to the drum at each end thereof and being of such shape as to fill in the said spaces at the ends of the guide strip, a raised portion on the thick end of the end fillers, and the said raised portion of the end fillers being spaced above the guide strip.

GEORGE FRANKLIN LE BUS.